United States Patent
Kåhre et al.

(10) Patent No.: US 12,284,023 B2
(45) Date of Patent: Apr. 22, 2025

(54) TECHNIQUE FOR RELAYING CONTROL MESSAGES BETWEEN A CORE NETWORK ENTITY AND RADIO DEVICES

(71) Applicant: Telefonaktiebolaget LM Ericsson (publ), Stockholm (SE)

(72) Inventors: Anna Kåhre, Sollentuna (SE); Dominik Budyn, Dobczyce (PL); Maciej Kedzior, Cracow (PL); Mateusz Przetocki, Cracow (PL); Marko Kovacec, Zagreb (HR); Szymon Galuszka, Cracow (PL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 402 days.

(21) Appl. No.: 17/927,905

(22) PCT Filed: May 28, 2020

(86) PCT No.: PCT/EP2020/064898
§ 371 (c)(1),
(2) Date: Nov. 28, 2022

(87) PCT Pub. No.: WO2021/239237
PCT Pub. Date: Dec. 2, 2021

(65) Prior Publication Data
US 2023/0216576 A1 Jul. 6, 2023

(51) Int. Cl.
*H04W 12/02* (2009.01)
*H04B 7/155* (2006.01)
*H04W 88/04* (2009.01)

(52) U.S. Cl.
CPC ........ *H04B 7/15507* (2013.01); *H04W 12/02* (2013.01); *H04W 88/04* (2013.01)

(58) Field of Classification Search
CPC ........................... H04B 7/15507; H04W 24/08
See application file for complete search history.

(56) References Cited

U.S. PATENT DOCUMENTS

2020/0213858 A1* 7/2020 Yi ........................... H04W 8/26

FOREIGN PATENT DOCUMENTS

| EP | 2978252 A1 | 1/2016 |
|---|---|---|
| WO | 0160083 A2 | 8/2001 |

OTHER PUBLICATIONS

Author Unknown, "Technical Specification Group Core Network and Terminals; Numbering, addressing and dentification; (Release 16)," Technical Specification 23.003, Version 16.2.0, Mar. 2020, 3GPP Organizational Partners, 140 pages.

(Continued)

*Primary Examiner* — Pamit Kaur
(74) *Attorney, Agent, or Firm* — Withrow & Terranova, PLLC

(57) ABSTRACT

A technique for relaying control messages between a core network entity of a communications network and radio devices served by the base station of the communications network is described. As to a method aspect of the technique, each of the control messages is relayed from one of the radio devices to the core network entity or from the core network entity to one of the radio devices. Each of the relayed control messages comprises an identifier that is indicative of at least one of the respective one of the radio devices and a user thereof. The control messages are stored at the base station, wherein the identifier is replaced in each of the stored control messages by a placeholder value that is independent of at least one of the respective one of the radio devices and the user thereof.

16 Claims, 7 Drawing Sheets

(56) References Cited

OTHER PUBLICATIONS

Author Unknown, "Technical Specification Group Core Network and Terminals; Non-Access-Stratum (NAS) protocol for Evolved Packet System (EPS); Stage 3 (Release 16)," Technical Specification 24.301, Version 16.4.0, Mar. 2020, 3GPP Organizational Partners, 573 pages.

Author Unknown, "Technical Specification Group Core Network and Terminals; Non-Access-Stratum (NAS) protocol for 5G System (5GS); Stage 3; (Release 16)," Technical Specification 24.501, Version 16.4.1, Mar. 2020, 3GPP Organizational Partners, 666 pages.

Author Unknown, "Technical Specification Group Services and System Aspects; Telecommunication management; Subscriber and equipment trace; Trace concepts and requirements (Release 16)," Technical Specification 32.421, Version 16.1.0, Mar. 2020, 3GPP Organizational Partners, 49 pages.

Author Unknown, "Technical Specification Group Services and System Aspects; Telecommunication management; Subscriber and equipment trace; Trace control and configuration management (Release 16)," Technical Specification 32.422, Version 16.1.0, Mar. 2020, 3GPP Organizational Partners, 214 pages.

Author Unknown, "Technical Specification Group Services and System Aspects; Telecommunication management; Subscriber and equipment trace; Trace data definition and management (Release 11)," Technical Specification 32.423, Version 11.4.0, Mar. 2013, 3GPP Organizational Partners, 83 pages.

Author Unknown, "Technical Specification Group Services and System Aspects; Telecommunication management; Key Performance Indicators (KPI) for Evolved Universal Terrestrial Radio Access Network (E-UTRAN); Requirements (Release 16)," Technical Specification 32.451, Version 16.0.0, Sep. 2019, 3GPP Organizational Partners, 13 pages.

Author Unknown, "Technical Specification Group Services and System Aspects; Telecommunication Management; Self-Organizing Networks (SON); Concepts and requirements (Release 15)," Technical Specification 32.500, Version 15.0.0, Jun. 2018, 3GPP Organizational Partners, 13 pages.

Author Unknown, "Technical Specification Group Radio Access Network; Evolved Universal Terrestrial Radio Access Network (E-UTRAN); S1 Application Protocol (S1AP) (Release 16)," Technical Specification 36.413, Version 16.1.0, Mar. 2020, 3GPP Organizational Partners, 391 pages.

Author Unknown, "Technical Specification Group Radio Access Network; NG-RAN; NG Application Protocol (NGAP) (Release 16)," Technical Specification 38.413, Version 16.1.0, Mar. 2020, 3GPP Organizational Partners, 341 pages.

SA WG5, "S3-130356: LS on Applying user consent for SON use cases," 3GPP TSG SA WG5 Meeting SA5#87, Jan. 14-18, 2013, Malta, 2 pages.

International Search Report and Written Opinion for International Patent Application No. PCT/EP2020/064898, mailed Feb. 5, 2021, 13 pages.

Author Unknown, "Technical Specification Group Services and System Aspects; Telecommunication management; Subscriber and equipment trace; Trace control and configuration management (Release 15)," Technical Specification 32.422, Version 15.3.0, Mar. 2020, 3GPP Organizational Partners, 189 pages.

* cited by examiner

TECHNIQUE FOR RELAYING CONTROL MESSAGES BETWEEN A CORE NETWORK ENTITY AND RADIO DEVICES

This application is a 35 U.S.C. § 371 national phase filing of International Application No. PCT/EP2020/064898, filed May 28, 2020, the disclosure of which is incorporated herein by reference in its entirety.

TECHNICAL FIELD

The present disclosure generally relates to a technique for relaying control messages between a core network entity and radio devices. More specifically, and without limitation thereto, a method and a device are provided for relaying control messages between the core network entity of a communications network and radio devices served by a base station of the communications network.

BACKGROUND

The core network of a wireless communications system, such as an Evolved Packet System (EPS) and a Fifth Generation System (5GS) specified by the Third Generation Partnership Project (3GPP), communicates with a radio device through one or more base stations serving the radio device. For example, the radio device and a core network entity of the core network exchange control messages for establishing a communication session, for maintaining continuous communications with the radio device as it moves from the base station to another base station, or for indicating the availability of downlink control information.

At least some of the control messages exchanged between the core network and the radio device—such as a user equipment (UE)—include one or more identifiers of the radio device, i.e., personal data capable of identifying the radio device or its user. The personal data may be written in Non-Access-Stratum (NAS) messages that are exchanged between the UE and the core network entity, e.g., a mobility management entity (MME), transparently over the base station.

Conventional base stations—such as existing eNodeBs—store logs, traces and events of the control messages. The stored control messages can be transferred from the base station for maintaining the communications network or analyzing its configuration. Since the stored control messages comprise the personal data, the stored control messages can jeopardize the protection of privacy in electronic communications or can even violate EU Directives 2009/136 and 2016/680.

SUMMARY

Accordingly, there is a need for a technique that allows monitoring the communications network without jeopardizing the protection of privacy in electronic communications.

According to a method aspect, the need is met by a method for relaying control messages between a core network entity of a communications network and radio devices served by a base station of the communications network. The method is performed by the base station. The method comprises or initiates a step of relaying each of the control messages from one of the radio devices to the core network entity or from the core network entity to one of the radio devices. Each of the relayed control messages comprises an identifier that is indicative of at least one of the respective one of the radio devices and a user thereof. The method further comprises or initiates a step of storing the control messages at the base station. The identifier is replaced in each of the stored control messages by a placeholder value that is independent of at least one of the respective one of the radio devices and the user thereof.

At least in some embodiments, by replacing the identifier in the stored control messages, the stored control messages can be used (e.g., outside of the base station and/or outside of an encrypted communication between the respective one of the radio devices and the core network entity) without jeopardizing data security or privacy and/or for monitoring or verifying an operation of the communications network.

Same or further embodiments may, by replacing the identifier in the stored control messages, remove personal data that is conventionally stored on the base station and eliminates risk that sensitive data can be exposed outside of the base station and/or misused.

The base station may be any node of a radio access network (RAN) and/or any node configured to provide or control radio access to each of the radio devices, e.g., under the control of the core network entity. The base station may also be referred to as radio node. Alternatively or in addition, the identifier in the control messages relayed between the respective one of the radio devices and the core network entity may enable the core network entity to determine whether or not the base station is to serve the respective one of the radio device and/or which quality of service (e.g., in terms of minimum bandwidth or maximum latency) to provide to the respective one of the radio devices through the base station. Alternatively or in addition, the base station may be an eNodeB (eNB) or a gNodeB (gNB) of the communications network, e.g., of a radio access network (RAN) of the communications network.

The core network entity may be any entity of a core network of the communications network. Alternatively or in addition, the core network entity may be any entity configured for handling connection and/or mobility of the radio devices. For example, the core network may comprise an evolved packet core (EPC) and/or a 5G core (5GC).

The control messages may comprise non-radio signaling, e.g., for an LTE or E-UTRAN access or for a New Radio (NR) access to the core network of the communications network. The control messages may be sent, processed and/or received by a layer of a protocol stack at the respective one of the radio devices and/or processed by a layer of a protocol stack at the core network entity, which layer is higher in the protocol stack than layers used for the communication with the base station.

The identifier may be or may comprise any data identifying the respective one of the radio devices or the user thereof. The user may be a subscriber of the service provided by the base station to the respective one of the radio devices.

The control message may comprise multiple fields. The identifier may be in one or more of the fields of the control message. For example, a combination of two or more fields of the control message may be indicative of the respective one of the radio device or the user thereof.

The method may be implemented as a method of anonymization of data in the base station. The anonymization of data in the base station can be achieved by removal of personal data (e.g. IMSI, IMEI, etc.) from the logs, traces and events that could be stored on the base station. Preferably, troubleshooting abilities are not impacted because data that does not include personal information is still available, e.g., for maintaining the communications network and/or for analyzing the configuration of the communications network.

The step of storing the control messages at the base station may comprise or initiate the step of replacing the identifier in each of the stored control messages by the placeholder value that is independent of at least one of the respective one of the radio devices and the user thereof.

The stored control messages or the control messages having the identifier replaced by the placeholder value, may also be referred to as anonymized control messages.

The stored control messages may be at least one of logs, traces and events of the control messages.

The control messages may comprise parameters, attributes or commands for establishing a communication session (e.g., one or more bearers) between the respective one of the radio devices and the communications network. The communications session may be protected by data encryption. Alternatively or in addition, the control messages may comprise parameters, attributes or commands for maintaining continuous communications with the radio device as it moves from the base station to another base station and/or for indicating the availability of data, e.g., downlink control information.

The base station may further be configured to perform at least one of tracing, logging and event generation based on data traffic, e.g. based on the control messages, between the radio devices and the core network entity. The base station may be configured to perform the step of storing during Trace Sessions, e.g., as defined in the 3GPP document TS 32.421, version 16.1.0.

The control message may be a NAS message and/or may be embedded in a NAS Protocol Data Unit (NAS PDU). The NAS PDU may be transparently forwarded between the radio device and the core network entity by the base station.

The technique may be applicable to 5G NR. The method may be performed by gNBs.

Personal data (e.g., the control messages comprising the identifier) when relayed may be encrypted by keys. The keys may be stored inside base station (e.g., the eNBs or gNBs) and/or shall never leave a secure environment within the base station, e.g., according to the 3GPP document TS 32.421, version 16.1.0, clause 5.6 (e.g., on Requirements for Privacy and Security) and/or the 3GPP document TS 36.413, version 16.1.0 (e.g., on NAS PDU delivery). By replacing the identifier in the stored control messages, the personal data is protected even if the stored control messages are analyzed outside of the secure environment within the base station.

The radio device may be a user equipment (UE) or a mobile station (MS).

The core network entity may be a Mobile Switching Center, Serving GPRS Support Node, or Mobility Management Entity.

Alternatively or in addition, the non-access stratum (NAS) may be defined in contrast to the access stratum (AS), which is responsible for carrying information over the wireless portion of the network. Alternatively or in addition, the NAS may be a protocol for messages passed between the radio device and the core network entity. The control messages may be passed transparently through the base station and/or the RAN.

Examples of the control messages (e.g., as NAS messages) may include Update or Attach messages, Authentication Messages, Service Requests and so forth. Once the User Equipment (UE) establishes a radio connection, the UE uses the radio connection to communicate with core nodes (e.g., the core network entity) of the communications network to coordinate service.

While AS may comprise dialogue explicitly between the radio device and the radio access network (RAN), the NAS may comprise dialogue between the radio device and the core network entity. For an LTE implementation of the communications network, a technical standard for NAS may comprise 3GPP TS 24.301.

At least some of the control messages exchanged between the radio device and the core network entity may include the identifiers of the radio device, i.e., personal data that allows identifying the radio devices or a user of the radio device. For example, the personal data may be written in Non-Access-Stratum (NAS) messages or paging messages that are exchanged between the UE and the core network entity, e.g., a mobility management entity (MME), transparently over the eNodeB.

The identifier may be or may comprise an international mobile subscriber identity (IMSI).

Preferably, personal data comprising the identifier that is stored on the base station is not used or processed by the base station. The technique may prevent that the person data can be misused if transferred from the base station, e.g., without negatively affecting the operation of the base station.

The method may further comprise or initiate a step of sending the stored control messages to a Network Management System (NMS) of the communications network or to an Operations, Administration and Maintenance (OAM) entity of the communications network.

For example, the stored control messages may be sent to a Self-configuration Subsystem of the OAM, e.g., according to the 3GPP document TS 32.500 version 15.0.0.

Any network element of the communications network, e.g., any network element of a core network of the communications network, may be requesting and/or receiving and/or using the stored control messages. For example, the core network entity and/or the network element receiving and/or using the stored control messages may comprise at least one of a serving gateway (S-GW), a packet data network gateway (PDN-GW or P-GW), a mobility management entity (MME) and a home subscriber server (HSS).

By way of example, the stored control messages may be read (e.g., received and/or analyzed) by tools or support engineers for analyzing an operation of the communications network or maintaining or servicing the communications network.

Each of the stored control messages may comprises the same placeholder value.

The placeholder value may be predefined or configured at the base station. The placeholder value may be configured according to a configuration message.

The method may further comprise or initiate a step of receiving a configuration message comprising a trigger for at least one of the storing of the control messages and the replacing of the identifier, e.g., in each of the stored control messages. At least one of the storing of the control messages and the replacing of the identifier in each of the stored control messages may be performed responsive to the receiving of the configuration message comprising the respective trigger.

The identifier may be selectively replaced in the stored data packet. For example, an attribute determining or triggering the replacing may be selectively set to be TRUE or FALSE. The attribute may be set to be TRUE by default, e.g., meaning that a deployment of the base station has data protection turned on.

The trigger may comprise requirements for starting a Trace Recording Session, e.g., according to the 3GPP document TS 32.421, V16.1.0, clause 5.3.2.

The placeholder value may be a pseudo-random number computed by the base station for each of the control messages relayed by the base station or for each of the radio devices served by the base station. Alternatively or in addition, the placeholder value may be a pseudo-random number computed by the base station for a set of the stored control messages or for a set of the radio devices.

The pseudo-random number may be computed responsive to receiving a configuration message comprising a trigger for at least one of the storing of the set of the control messages and the replacing of the identifier in each of the stored control messages.

The control messages may be stored at the base station for a predefined or configured retention time. The retention time may be configured according to a configuration message.

The configuration message may be received from the core network entity of the communications network, from the NMS of the communications network, or from the OAM entity of the communications network.

The step of relaying may comprise receiving at least one of the control messages on a radio interface, optionally an uplink radio channel, from the respective one of the radio devices and forwarding the at least one received control message on a backhaul interface, optionally a non-radio channel, to the core network entity. Alternatively or in addition, the step of relaying may comprise receiving at least one of the control messages on a backhaul interface, optionally a non-radio channel, from the core network entity and forwarding the at least one received control message on a radio interface, optionally a downlink radio channel, to the respective one of the radio devices.

A protocol stack of the radio interface may comprise at least one of a Radio Resource Control (RRC) layer, a Packet Data Convergence Protocol (PDCP) layer, and a Radio Link Control (RLC) layer. At least one of these layers may implement the method.

The communications system may comprise a Fifth Generation System (5GS). The radio interface may comprise an interface Uu for New Radio (NR). Alternatively or in addition, the communications system may comprise an Evolved Packet System (EPS). The radio interface may comprise an interface Uu for Long Term Evolution (LTE).

The communications system may comprise a Fifth Generation System (5GS). A protocol stack of the backhaul interface may comprise a Next Generation Application Protocol (NG-AP) layer. The NG-AP may be implemented according to the 3GPP document TS 38.413, version 16.1.0. Alternatively or in addition, the communications system may comprise an Evolved Packet System (EPS). A protocol stack of the backhaul interface may comprise an S1 Application Protocol (S1-AP) layer.

The communications system may comprise the 5GS, and the backhaul interface may comprise an N2 interface or an N2 reference point. Alternatively or in addition, the communications system may comprise the EPS, and the backhaul interface may comprise an S1 interface or an S1-MME interface.

The control messages may comprise non-radio signaling. The control message may be a non-access stratum (NAS) message. The control signals may comprise parameters of the NAS or commands of the NAS.

Alternatively or in addition, the NAS may be used to convey the control messages between the radio device (e.g., a user equipment, UE) and the core network entity (e.g., a mobility management entity, MME, or an Access and Mobility Management Function, AMF).

The control messages may comprise at least one of NAS messages (e.g., NAS protocol data units or NAS PDUs), N1 messages (e.g., N1 PDUs), and paging messages (e.g., paging PDUs).

The communications network may comprise the EPS and/or the 5GS. The NAS may use or comprise protocols of the EPS and/or the 5GS. The NAS may use or comprise a protocol for EPS Mobility Management (EMM) and/or a protocol for EPS Session Management (ESM). Alternatively or in addition, the NAS may use or comprise a protocol for 5GS mobility management (5GMM).

The control message (e.g., a NAS PDU) may comprise at least one of the IMSI and the IMEI, e.g., as the identifier.

Alternatively or in addition, the identifier (e.g., the SUPI) may be replaced before the identifier is or could be exposed, e.g., according to the 3GPP document TS 24.501, version 16.4.1 (e.g., according to the NAS protocol for the communications network implementing 5GS) or 3GPP document TS 24.301, version 16.4.0 (e.g., for the NAS protocol for the communications system implementing EPS).

The radio device may be configured (e.g., by the base station) to decode a content (e.g., a Paging Cause) of the paging message. The core network entity may be configured to send the paging message to all base stations in a Tracking Area. Each of those base stations in the Tracking Area may transmit the same paging message.

A Service Data Unit (SDU) in a PDU of the protocol stack of the radio interface and/or an SDU in a PDU of the protocol stack of the backhaul interface may comprise at least one of the non-radio signaling, the NAS PDU, the N1 PDU, and the paging PDU.

The control messages may be relayed at the base station transparently and/or agnostically with regard to control signals included in the control messages. The control messages may be transparently forwarded between the respective one of the radio devices and the core network entity.

The core network entity may be or may comprise at least one of a mobility management entity (MME) and an Access and Mobility Management Function (AMF).

The control messages may be at least one of a peer-to-peer communication between the core network entity and the respective one of the radio devices and end-to-end encrypted between the core network entity and the respective one of the radio devices.

The control messages may be conveyed on a NAS signaling connection (e.g., a peer-to-peer connection, optionally according to an N1 mode, between UE as the radio device and the AMF as the core network entity). The NAS signaling connection may be a concatenation of an RRC connection via the Uu interface (e.g., a Uu reference point) and an NG connection via the N2 reference point (e.g., for 3GPP access). Alternatively or in addition, the NAS signaling connection may be a concatenation of an IPsec tunnel (e.g., via an interworking reference point or a NWu reference point) and an NG connection via the N2 reference point (e.g., for non-3GPP access).

The identifier may comprise at least one of a mobile identity, optionally a 5GS mobile identity or an EPS mobile identity; a subscription permanent identifier (SUPI); an international mobile subscriber identity (IMSI); an international mobile equipment identity (IMEI); an international mobile station equipment identity; a subscription concealed identifier (SUCI); and a global unique temporary Identifier (GUTI).

The identifier may be implemented according to 3GPP TS 24.501, version 16.4.1, clause 5.3.2. Alternatively or in addition, the identifier may be a globally unique and/or permanent identity, e.g., the 5G subscription permanent identifier (SUPI). The SUPI may be allocated to each subscriber for 5GS-based services. The SUPI may take the form of a network access identifier (NAI), e.g., if the SUPI contains a network specific identifier, e.g., Global Cable Identifier or Global Line Identifier. The structure of the SUPI and its derivatives may be implemented according to the 3GPP document TS 23.003, version 16.2.0.

The control message may comprise the identifier according to 3GPP document TS 32.421, version 16.1.0, clause 5.3.2. For example, the identifier may comprise at least one of IMSI, IMEI, IMEISV and Public User Identity. For example in the case of a trace other than Cell Traffic Trace, the correlation of Trace data is done with a Trace Reference and the identifier, e.g., IMSI/IMEI/IMEISV/Public User Identity.

The NAS PDU (e.g., in an RRC Connection Request) may be sensitive, because it is related to or comprises the IMEI or IMSI.

The base station may be configured to provide radio access to any one of a plurality of radio devices including the radio devices served by the base station. The identifier in the relayed control messages may be uniquely indicative of the respective one of the radio devices among the plurality of radio devices.

The identifier in the relayed control messages may be uniquely indicative of the respective one of the radio devices among a plurality of radio devices served by the communications network.

Each of the stored control messages may be structurally identical with and/or unabridged compared to the respective one of the relayed control messages.

The identifier may be replaced by a uniform bit string as the placeholder value, preferably a sequence of binary zeros or a sequence of binary ones, in the stored control messages.

Each of the control messages may comprises a protocol data unit (PDU).

The identifier may be replaced before storing the control message or in the stored control messages.

Each or at least one of the control messages may comprise multiple identifiers that each is indicative of, or that are in combination indicative of, at least one of the respective one of the radio devices and a user thereof. Each of the multiple identifiers may be replaced in the stored control messages by the placeholder value that is independent of at least one of the respective one of the radio devices and the user thereof.

The replacing may comprise replacing whole content of the control messages, e.g., the NAS PDU, in the stored logs, traces and/or events.

In any aspect, the radio device and/or the core network entity may be configured to perform steps interacting with the base station or mirroring any of the steps of the method aspect performed by the base station.

Any aspect of the technique may be implemented at the RAN. The method may be performed by a base station or a cell of the RAN. The base station may encompass any station that is configured to provide radio access to the radio device.

A base station or a cell of the RAN may serve a plurality of radio devices. The radio device or each of the radio devices may be a user equipment (UE). Optionally, the radio device may be configured for peer-to-peer communication (e.g., on a sidelink) and/or for accessing the RAN (e.g. an UL and/or downlink, DL).

The radio device may be a user equipment (UE, e.g., a 3GPP UE), a mobile or portable station (STA, e.g. a Wi-Fi STA), a device for machine-type communication (MTC) or a combination thereof. Examples for the UE and the mobile station include a mobile phone and a tablet computer. Examples for the portable station include a laptop computer and a television set. Examples for the MTC device include robots, sensors and/or actuators, e.g., in manufacturing, automotive communication and home automation. The MTC device may be implemented in household appliances and consumer electronics. Examples for the combination include a self-driving vehicle, a door intercommunication system and an automated teller machine.

Examples for the base station may include a 3G base station or Node B, 4G base station or eNodeB, a 5G base station or gNodeB, an access point (e.g., a Wi-Fi access point) and a network controller (e.g., according to Bluetooth, ZigBee or Z-Wave).

The RAN may be implemented according to the Global System for Mobile Communications (GSM), the Universal Mobile Telecommunications System (UMTS), Long Term Evolution (LTE) and/or New Radio (NR).

The technique may be implemented a Medium Access Control (MAC) layer, a Radio Link Control (RLC) layer, a Packet Data Convergence Protocol (PDCP) and/or a Radio Resource Control (RRC) layer of a protocol stack for the radio communication.

As to another aspect, a computer program product is provided. The computer program product comprises program code portions for performing any one of the steps of the method aspects disclosed herein when the computer program product is executed by one or more computing devices. The computer program product may be stored on a computer-readable recording medium. The computer program product may also be provided for download via a data network, e.g., via the RAN and/or via the Internet and/or by the base station. Alternatively or in addition, the method may be encoded in a Field-Programmable Gate Array (FPGA) and/or an Application-Specific Integrated Circuit (ASIC), or the functionality may be provided for download by means of a hardware description language.

As to a device aspect, a device (e.g., the base station) for relaying control messages between a core network entity of a communications network and radio devices served by the base station of the communications network is provided. The device comprises memory operable to store instructions and processing circuitry operable to execute the instructions, such that the device is operable to perform the method aspect.

As to a further device aspect, a device (e.g., the base station) for relaying control messages between a core network entity of a communications network and radio devices served by the base station of the communications network is provided. The device is configured to perform the method aspect.

The device may comprise a radio interface configured to communicate with the radio device for the relaying.

As to a system aspect, a communication system comprising a host computer is provided. The host computer comprises processing circuitry configured to provide user data and a communication interface configured to forward the user data to a radio network (e.g., the communications network) for transmission to a user equipment (UE, e.g., the radio device) through a base station comprises a radio interface and processing circuitry, the processing circuitry of the base station being configured to execute any of the steps of the method aspect.

The communication system may further comprise the UE. The UE may comprise a radio interface and processing circuitry, the processing circuitry of the UE being configured to transmit or receive the relayed control message.

The communication system may further comprise the radio network (e.g., the communications network) and/or the base station.

The processing circuitry of the host computer may be configured to execute a host application, thereby providing the user data. The processing circuitry of the UE may be configured to execute a client application associated with the host application.

The device (or any node or station for embodying the technique) or the system may further include any feature disclosed in the context of the method aspect. Particularly, any unit or module of the device or system or the processing circuitry of the device or system may be configured to perform or initiate one or more of the steps of the method aspect.

BRIEF DESCRIPTION OF THE DRAWINGS

Further details of embodiments of the technique are described with reference to the enclosed drawings, wherein.

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a 3GPP LTE implementation, it is readily apparent that the technique described herein may also be implemented in any other radio access network or communications network, including a 5G New Radio (NR) or 5G system (5GS) implementation, a successor of 3GPP LTE, a Wireless Local Area Network (WLAN) according to the standard family IEEE 802.11, and/or ZigBee based on IEEE 802.15.4.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

Figure 1:
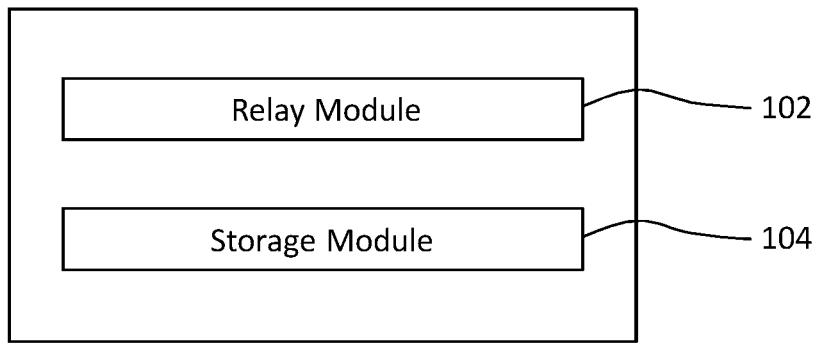
FIG. 1 shows a schematic block diagram of an embodiment of a device for relaying control messages between a core network entity of a communications network and radio devices.

FIG. 1 schematically illustrates a block diagram of a base station for relaying control messages between a core network entity of a communications network and radio devices served by the base station of the communications network. The base station is generically referred to by reference sign 100.

The base station 100 comprises a relay module 102 that relays each of the control messages from one of the radio devices to the core network entity or from the core network entity to one of the radio devices, wherein each of the relayed control messages comprises an identifier that is indicative of the respective one of the radio devices and/or a user thereof. The base station 100 further comprises a storage module 104 that stores the control messages at the base station 100, wherein the identifier is replaced in each of the stored control messages by a placeholder value that is independent of the respective one of the radio devices and/or independent of the user of said radio device.

The base station 100 may be connected to and/or may be part of a radio access network (RAN or briefly: radio network) of the communications network. The base station 100 may be embodied by or at a radio head of the RAN, a node connected to the RAN for controlling the base station or a combination thereof.

Any of the modules of the base station 100 may be implemented by units configured to provide the corresponding functionality.

The base station 100 may encompass a network controller (e.g., a Wi-Fi access point) or a radio access node (e.g. a 3G Node B, a 4G eNodeB or a 5G gNodeB) of the RAN. The base station 100 may be configured to provide radio access. Alternatively or in addition, the one or more radio devices may include a mobile or portable station or a radio device connectable to the RAN. Each radio device may be a user equipment (UE) and/or a device for machine-type communication (MTC). Two or more radio devices may be configured to wirelessly connect to each other, e.g., in an ad-hoc radio network or via 3GPP sidelinks.

Figure 2:
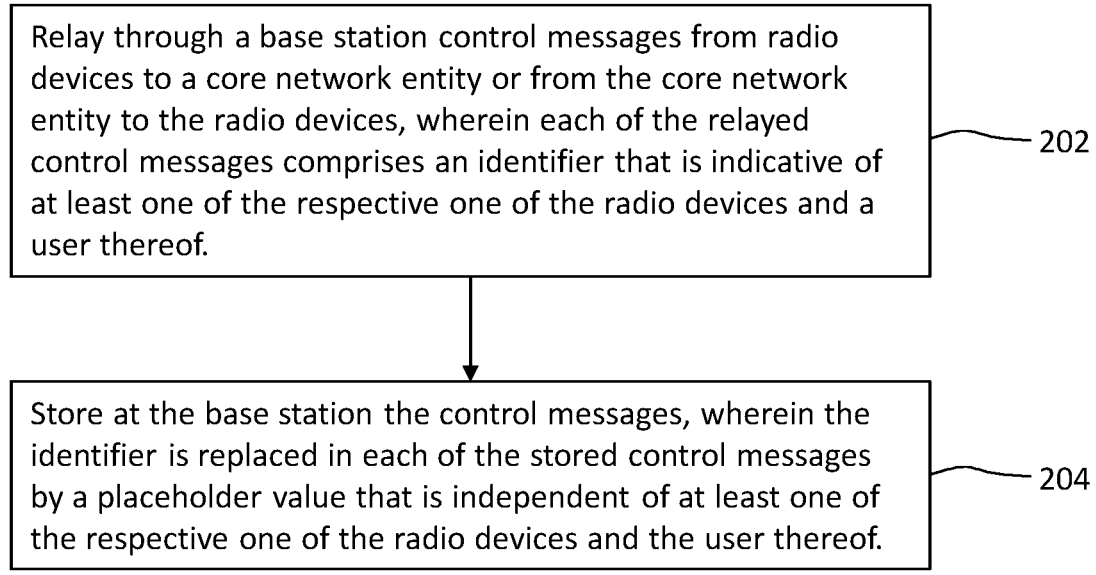
FIG. 2 shows a schematic flowchart for an embodiment of a method of relaying control messages between a core network entity of a communications network and radio devices, which may be implementable by the device of FIG. 1.

FIG. 2 shows a flowchart for a method 200 of relaying control messages between a core network entity of a communications network and radio devices served by a base station of the communications network. The method 200 comprises a step 202 of relaying each of the control messages from one of the radio devices to the core network entity or from the core network entity to one of the radio devices (120). Each of the relayed control messages comprises an identifier that is indicative of the respective one of the radio devices and/or a user thereof. The method 200 further comprises a step 204 of storing the control messages at the base station, wherein the identifier is replaced in each of the stored control messages by a placeholder value that is independent of the respective one of the radio devices and/or the user thereof.

The method 200 may be performed by the base station 100, e.g., at or using the base station of the RAN. For example, the modules 102 and 104 may perform the steps 202 and 204, respectively.

Embodiments of the technique maintain compatibility with 3GPP LTE or 3GPP NR.

Figure 3:
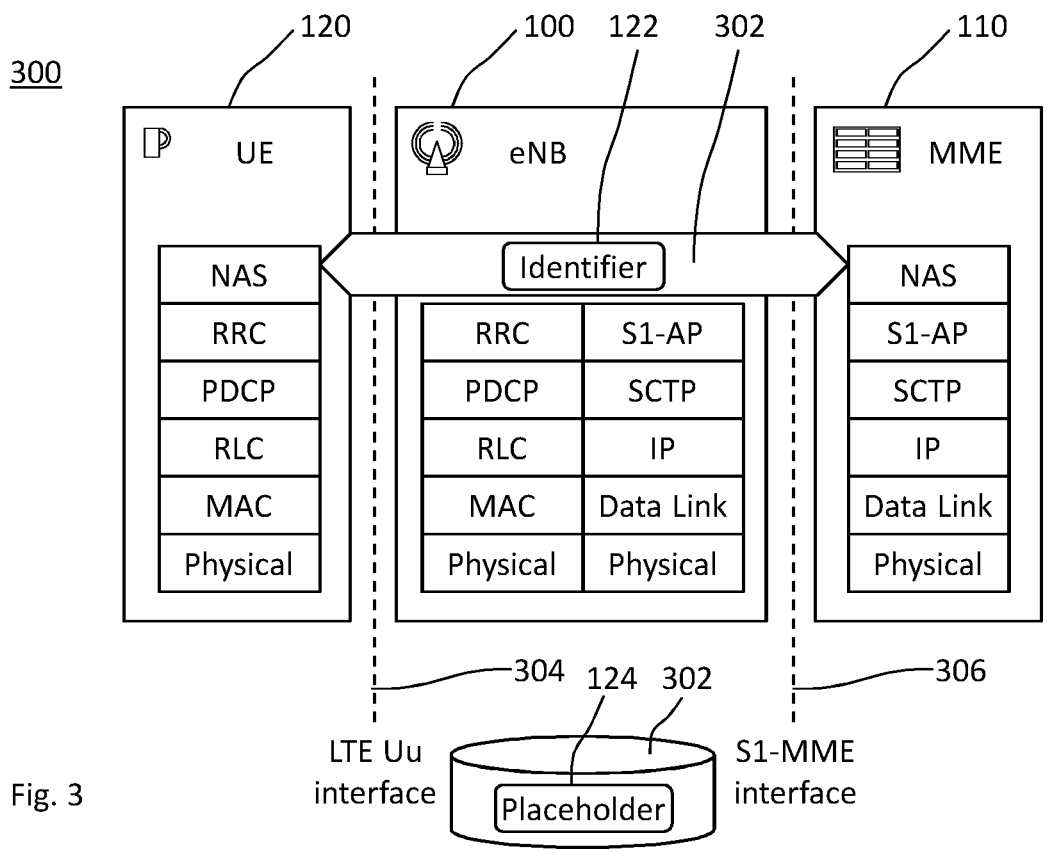
FIG. 3 schematically illustrates exemplary protocol stacks for a communications network comprising a base station embodying the device of FIG. 1 or performing the method of FIG. 2.

FIG. 3 schematically illustrates protocol stacks at an embodiment of the base station 100, an MME embodiment of the core network entity 110 and a UE embodiment of one of the radio devices 120.

The control message 302 may comprise NAS signaling according to a NAS protocol, e.g., above layers providing radio communication (e.g., an Uu interface 304) towards the radio device 120 and backhaul communication (e.g., an S1 interface 306) towards the MME 110.

The step of replacing the identifier may comprise replacing the identifier 122 in the stored NAS message 302 with non-meaningful data, e.g. a uniform bit string or a random number, as the placeholder value 124.

The technique, e.g., the method 200, may be implemented on the RRC layer and/or the PDCP layer and/or RLC layer, at which layer the control message 302 or data conventionally comprising the control message 302 was stored on the base station 100, e.g., recorded in logs, traces and/or events.

The base station 100 may be any node of the RAN.

While personal data was stored on the node inside logs, traces and events by legacy implementations, making data vulnerable when it was sent outside of the node, embodiments of the node 100 and the method 200 maintain the functions of logging, tracing and event generation without exposing the identifier of the radio device or user thereof.

As the stored control messages 302 are not processed nor used by the node 100 (e.g., an eNodeB), it can be removed and/or not written.

The identifier, i.e., personal data, could be found in NAS messages 302 which are exchanged between the UE 120 and the MME 110, transparently over the eNodeB 100.

Figure 4:
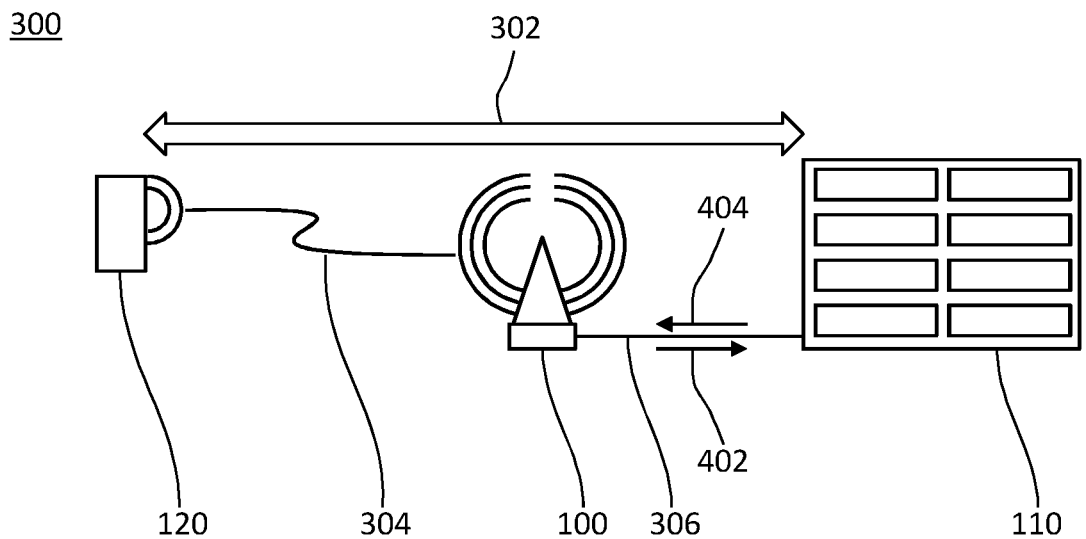
FIG. 4 schematically illustrates an exemplary communications network comprising a base station embodying the device of FIG. 1 or performing the method of FIG. 2.

FIG. 4 schematically illustrates an example of the communications network 300 comprising an embodiment of the base station 100 in communication between an embodiment of the core network entity 110 and an embodiment of the radio device 120.

The establishing of the NAS communication 302 over the S1 interface 306 may comprise exchanging an eNB-UE S1-AP identity (ID) 402 and an MME-UE S1-AP ID 404 over the S1 interface 306.

In any embodiment of the technique, the original control message 302 exchanged between UE 120 and MME 110 is not impacted by the eNB 100. For all functionalities related with traces, logging and events generation, the eNB 100 uses a local copy of the control message 302. Before the message copy 302 in the eNB 100 is stored in any traces, logs or events, the at least one identifier 122, e.g., Information Elements (IEs) containing personal data are replaced with non-meaningful data, for example by setting all bits of said IE to 1 as the placeholder value 124.

For example, the identifier 122 may be the IE comprising a NAS PDU or UE Paging Identity or the identifier 122 may be the NAS PDU or UE Paging Identity.

The replacing may be implemented in a way that integrity of an S1 message and/or an RRC message containing the replaced IE is not broken. For example, only the content of the IE is replaced, while other IEs and total message length remain intact. Such approach allows to still decode the stored (e.g., logged) S1 message and/or RRC message except of the content of replaced IE.

Below is an example of a stored control message 302 decoded from eNB traces with replaced NAS PDU as the identifier 122. The placeholder value 124 is printed in bold font.

Stored control message 302 with replaced NAS PDU:

```
4G S1AP: InitialUEMessage ( RacUeRef: 8392704 )
tac:1 plmnIdentity:123-456 plmnIdentity:123-456 enbId: 999968 cellId:1
enbUeS1apId:262144 cause:mo-Signalling
pdu: value S1AP-PDU ::= initiatingMessage : {
  procedureCode 12,
  criticality ignore,
  value InitialUEMessage : {
    protocolIEs {
      {
        id 8,
        criticality reject,
        value ENB-UE-S1AP-ID : 262144
      },
      {
        id 26,
        criticality reject,
        value NAS-PDU : 'ffffffffffffffffffffffffffff'H
      },
      {
        id 67,
        criticality reject,
        value TAI : {
          pLMNidentity '214365'H,
          tAC '0001'H
        }
      },
      {
        id 100,
        criticality ignore,
        value EUTRAN-CGI : {
          pLMNidentity '214365'H,
          cell-ID '1111010000100010000000000001' B
        }
      },
      {
        id 134,
        criticality ignore,
        value RRC-Establishment-Cause : mo-Signalling
      }
    }
  }
}
```

The original control massage 302 as relayed may read (with the identifier 122 printed in bold font):

```
4G S1AP: InitialUEMessage ( RacUeRef: 8392704 )
tac:1 plmnIdentity:123-456 plmnIdentity:123-456 enbId:999983 cellId:1
enbUeS1apId:262144 cause:mo-Signalling
pdu: value S1AP-PDU ::= initiatingMessage : {
  procedureCode 12,
  criticality ignore,
  value InitialUEMessage : {
    protocolIEs {
      {
        id 8,
        criticality reject,
        value ENB-UE-S1AP-ID : 262144
```

```
        },
        {
          id 26,
          criticality reject,
          value NAS-PDU : '07417104113254f602202000040201d011'H
        },
        {
          id 67,
          criticality reject,
          value TAI : {
            pLMNidentity '214365'H,
            tAC '0001'H
          }
        },
        {
          id 100,
          criticality ignore,
          value EUTRAN-CGI : {
            pLMNidentity '214365'H,
            cell-ID ' 1111010000100010111100000001'B
          }
        },
        {
          id 134,
          criticality ignore,
          value RRC-Establishment-Cause : mo-Signalling
        }
      }
    }
}
```

Alternatively or in addition, any embodiment of the technique may replace the IMSI and/or the IMEI and/or the Globally Unique Temporary ID (GUTI) as the identifier 122.

Each of the UE 120 has a one or more unique ID, e.g., IMSI, IMEI etc., but to use these unique ID all the time during the communication would make the security vulnerable. So in some wireless communication, the control messages 302 may use a temporary ID which maps the unique ID allocated to UE 120.

Examples of NAS control messages 302 using GUTI are Attach Request, Attach Accept and Attach Complete.

Alternatively or in addition, the method 200 may further comprise a step of sending the stored control messages 302 to an entity of the communications network 300, e.g., for Operations and Management or operations, administration and management (OAM). The OAM may be implemented according to 3GPP specifications.

Figure 5:
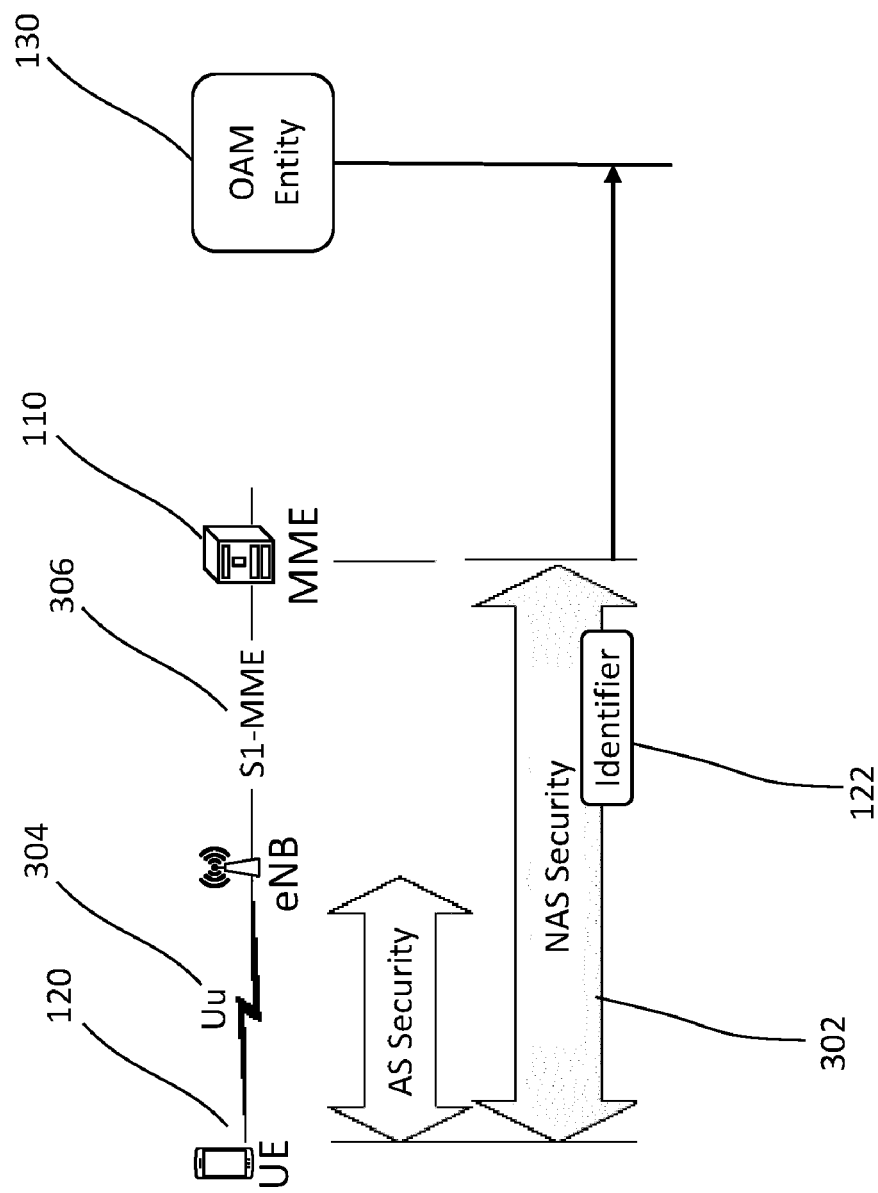
FIG. 5 schematically illustrates a signaling diagram resulting from embodiments of the radio device, the base station and the core network entity in communication.

FIG. 5 schematically illustrates a signaling diagram including in an embodiment of the communications network 300, comprising the step of sending the stored control messages 302 to the OAM entity 130.

The OAM entity 130 may be configured to perform functions related to fault of the communications network 300, configuration of the communications network 300, performance of the communications network 300 and security in the communications network 300.

The OAM entity 130 receiving the stored control messages 302 with the identifier 122 replaced may comprise any one of the entities of the OAM architecture, e.g. network elements configured to manage multiple base stations 100 (e.g., eNodeBs); element managers (EM) configured to manage a collection of elements of the same type such as the core network entities (e.g., MMEs, S-GWs, P-GWs, etc.); or network managers (NMs) configured to manage multiple element managers.

For example, based on the stored control messages 302, the OAM entity 130 may enforce LTE quality of service (QoS) demands. Alternatively or in addition, the OAM entity may derive Key Performance Indicators (KPIs). The KPIs are indicators allow the network 300 to offer subscribers (i.e., the users of the radio devices 120) a better service quality, and ensures an efficient resource allocation. Overall, KPIs are responsible with evaluating the LTE network's performance.

E.g. as specified in the 3GPP TS 32.451 document, based on the stored data, several types of KPI parameters may be derived. The derived KPI may measure accessibility, retainability, integrity, availability and/or mobility. Alternatively or in addition, the derived KPI may measure utilization, traffic, latency, accessibility.

Accessibility is a measurement that allows operators to know information related to the mobile services accessibility for the subscriber (i.e., the users). The measurement is performed through Radio Access Bearer (e.g., E-RAB) service of the RAN.

Retainability measures how many times a service was interrupted or dropped during use, thus preventing the subscriber to benefit from it or making it difficult for the operator to charge for it.

Integrity measures the high or low quality of a service while the subscriber is using it. The measurement is performed through the RAN's delivery of IP packets.

Availability measures a service's availability for the subscriber (i.e., the user). The measurement is performed by determining the percentage of time that the service was available for the subscribers served by a specific cell of the base station 100. The measurement can also aggregate data from more cells or from the whole communications network 300.

Mobility measures how many times a service was interrupted or dropped during a subscriber's handover or mobility from on cell or base station to another. The measurement is performed in the RAN.

Figure 6:
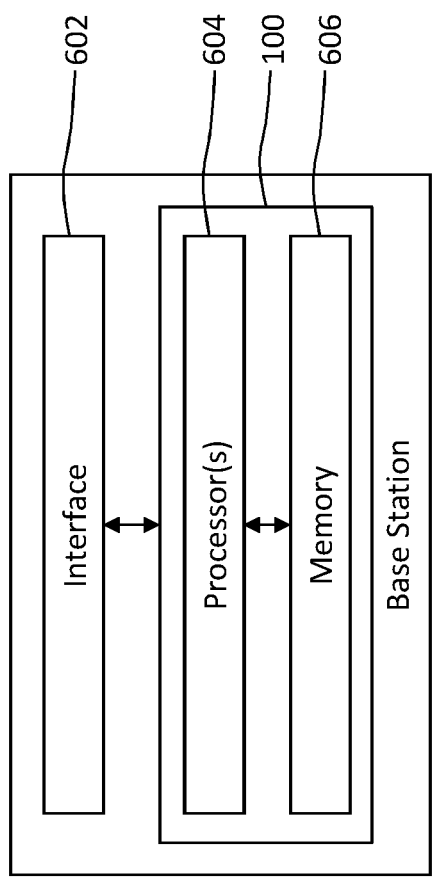
FIG. 6 shows a schematic block diagram of a base station embodiment of the device of FIG. 1.

FIG. 6 shows a schematic block diagram for an embodiment of the base station 100. The base station 100 comprises one or more processors 604 for performing the method 200 and memory 606 coupled to the processors 604. For example, the memory 606 may be encoded with instructions that implement at least one of the modules 102 and 104.

The one or more processors 604 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the base station 100, such as the memory 606, data receiver or RAN functionality. For example, the one or more processors 604 may execute instructions stored in the memory 606. Such functionality may include providing various features and steps discussed herein, including any of the benefits disclosed herein. The expression "the device being operative to perform an action" may denote the base station 100 being configured to perform the action.

As schematically illustrated in FIG. 6, the base station 100 may be embodied by any node of the RAN. The base station 600 comprises a radio interface 602 coupled to the device 100 for radio communication with one or more radio devices 120.

In a variant, the functionality of the base station 100 is provided by a node of the RAN or a core network linked to the RAN. That is, the node performs the method 200. The functionality of the base station 100 is provided by the node to a station, e.g., via the interface 602 or a dedicated wired or wireless interface.

Figure 7:
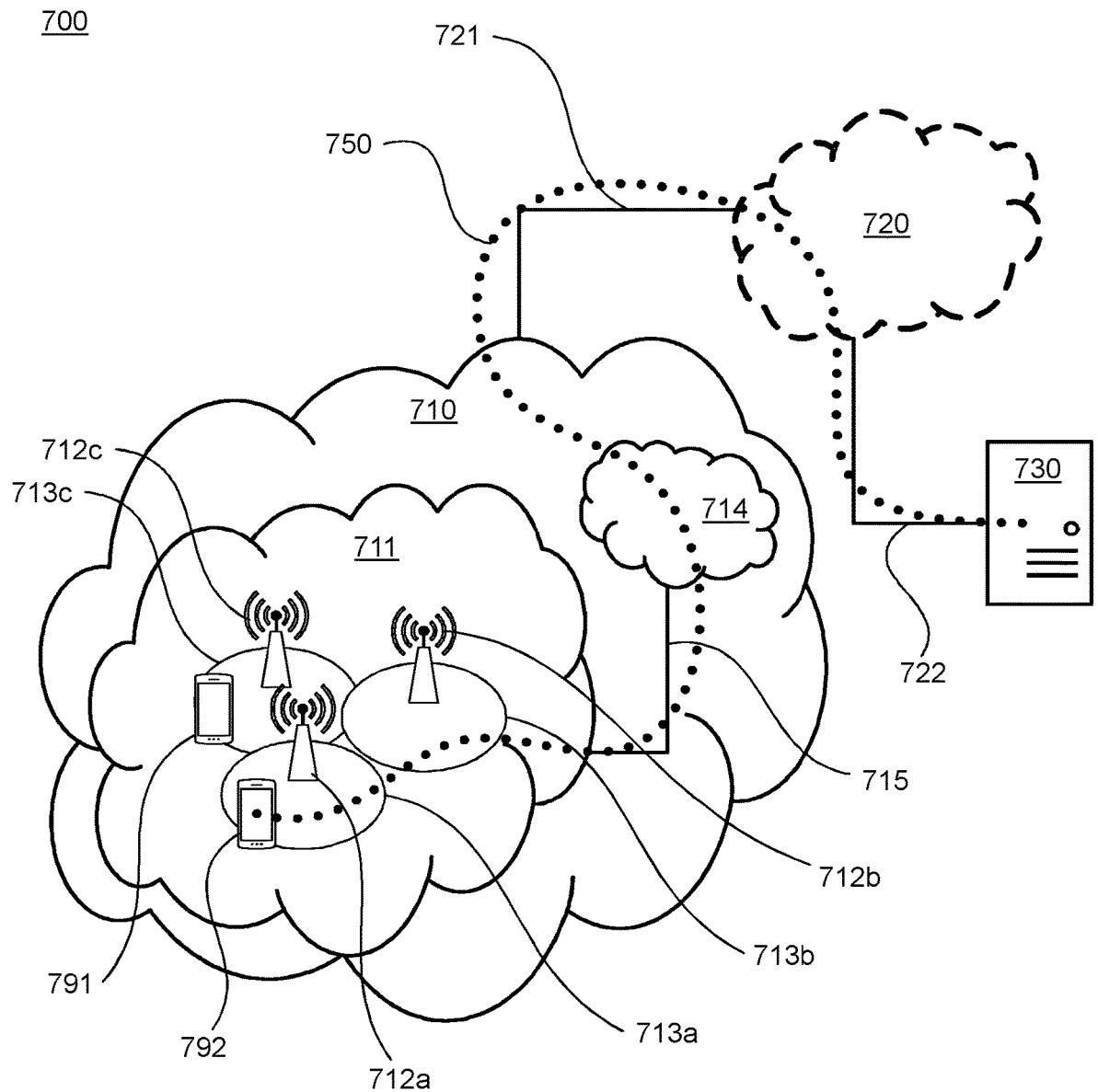
FIG. 7 schematically illustrates an embodiment of a telecommunications network connected via an intermediate network to a host computer.

With reference to FIG. 7, in accordance with an embodiment, a communication system 700 includes a telecommunication network 710, such as a 3GPP-type cellular network, which comprises an access network 711, such as a radio access network, and a core network 714. The access network 711 comprises a plurality of base stations 712a, 712b, 712c, such as NBs, eNBs, gNBs or other types of wireless access points, each defining a corresponding coverage area 713a, 713b, 713c. Each base station 712a, 712b, 712c is connectable to the core network 714 over a wired or wireless connection 715. A first user equipment (UE) 791 located in coverage area 713c is configured to wirelessly connect to, or be paged by, the corresponding base station 712c. A second UE 792 in coverage area 713a is wirelessly connectable to the corresponding base station 712a. While a plurality of UEs 791, 792 are illustrated in this example, the disclosed embodiments are equally applicable to a situation where a sole UE is in the coverage area or where a sole UE is connecting to the corresponding base station 712.

The telecommunication network 710 is itself connected to a host computer 730, which may be embodied in the hardware and/or software of a standalone server, a cloud-implemented server, a distributed server or as processing resources in a server farm. The host computer 730 may be under the ownership or control of a service provider, or may be operated by the service provider or on behalf of the service provider. The connections 721, 722 between the telecommunication network 710 and the host computer 730 may extend directly from the core network 714 to the host computer 730 or may go via an optional intermediate network 720. The intermediate network 720 may be one of, or a combination of more than one of, a public, private or hosted network; the intermediate network 720, if any, may be a backbone network or the Internet; in particular, the intermediate network 720 may comprise two or more sub-networks (not shown).

The communication system 700 of FIG. 7 as a whole enables connectivity between one of the connected UEs 791, 792 and the host computer 730. The connectivity may be described as an over-the-top (OTT) connection 750. The host computer 730 and the connected UEs 791, 792 are configured to communicate data and/or signaling via the OTT connection 750, using the access network 711, the core network 714, any intermediate network 720 and possible further infrastructure (not shown) as intermediaries. The OTT connection 750 may be transparent in the sense that the participating communication devices through which the OTT connection 750 passes are unaware of routing of uplink and downlink communications. For example, a base station 712 may not or need not be informed about the past routing of an incoming downlink communication with data originating from a host computer 730 to be forwarded (e.g., handed over) to a connected UE 791. Similarly, the base station 712 need not be aware of the future routing of an outgoing uplink communication originating from the UE 791 towards the host computer 730.

Example implementations, in accordance with an embodiment, of the UE, base station and host computer discussed in the preceding paragraphs will now be described with reference to FIG. 8. In a communication system 800, a host computer 810 comprises hardware 815 including a communication interface 816 configured to set up and maintain a wired or wireless connection with an interface of a different communication device of the communication system 800. The host computer 810 further comprises processing circuitry 818, which may have storage and/or processing capabilities. In particular, the processing circuitry 818 may comprise one or more programmable processors, application-specific integrated circuits, field programmable gate arrays or combinations of these (not shown) adapted to execute instructions. The host computer 810 further comprises software 811, which is stored in or accessible by the host computer 810 and executable by the processing circuitry 818. The software 811 includes a host application 812. The host application 812 may be operable to provide a service to a remote user, such as a UE 830 connecting via an OTT connection 850 terminating at the UE 830 and the host computer 810. In providing the service to the remote user, the host application 812 may provide user data which is transmitted using the OTT connection 850.

The communication system 800 further includes a base station 820 provided in a telecommunication system and comprising hardware 825 enabling it to communicate with the host computer 810 and with the UE 830. The hardware 825 may include a communication interface 826 for setting up and maintaining a wired or wireless connection with an interface of a different communication device of the communication system 800, as well as a radio interface 827 for setting up and maintaining at least a wireless connection 870 with a UE 830 located in a coverage area (not shown in FIG. 8) served by the base station 820. The communication interface 826 may be configured to facilitate a connection 860 to the host computer 810. The connection 860 may be direct or it may pass through a core network (not shown in FIG. 8) of the telecommunication system and/or through one or more intermediate networks outside the telecommunication system. In the embodiment shown, the hardware 825 of the base station 820 further includes processing circuitry 828, which may comprise one or more programmable processors, application-specific integrated circuits, field programmable gate arrays or combinations of these (not shown) adapted to execute instructions. The base station 820 further has software 821 stored internally or accessible via an external connection.

The communication system 800 further includes the UE 830 already referred to. Its hardware 835 may include a radio interface 837 configured to set up and maintain a wireless connection 870 with a base station serving a coverage area in which the UE 830 is currently located. The hardware 835 of the UE 830 further includes processing circuitry 838, which may comprise one or more programmable processors, application-specific integrated circuits, field programmable gate arrays or combinations of these (not shown) adapted to execute instructions. The UE 830 further comprises software 831, which is stored in or accessible by the UE 830 and executable by the processing circuitry 838. The software 831 includes a client application 832. The client application 832 may be operable to provide a service to a human or non-human user via the UE 830, with the support of the host computer 810. In the host computer 810, an executing host application 812 may communicate with the executing client application 832 via the OTT connection 850 terminating at the UE 830 and the host computer 810. In providing the service to the user, the client application 832 may receive request data from the host application 812 and provide user data in response to the request data. The OTT connection 850 may transfer both the request data and the user data. The client application 832 may interact with the user to generate the user data that it provides.

Figure 8:
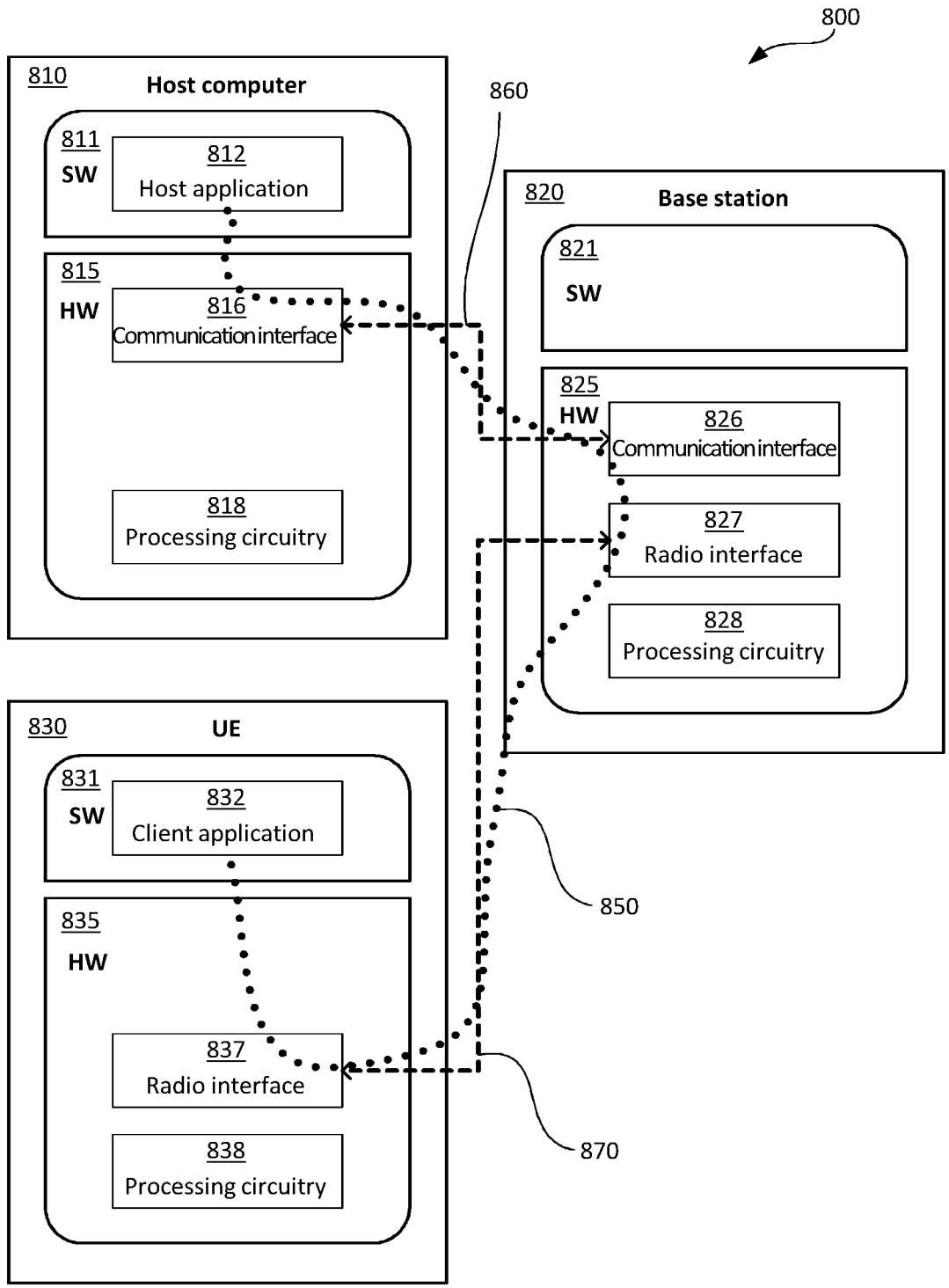
FIG. 8 shows a generalized block diagram of an embodiment of a host computer communicating via a base station with a user equipment over a partially wireless connection.

It is noted that the host computer 810, base station 820 and UE 830 illustrated in FIG. 8 may be identical to the host computer 730, one of the base stations 712a, 712b, 712c and one of the UEs 791, 792 of FIG. 7, respectively. This is to say, the inner workings of these entities may be as shown in FIG. 8 and independently, the surrounding network topology may be that of FIG. 7.

In FIG. 8, the OTT connection 850 has been drawn abstractly to illustrate the communication between the host computer 810 and the user equipment 830 via the base station 820, without explicit reference to any intermediary devices and the precise routing of messages via these devices. Network infrastructure may determine the routing, which it may be configured to hide from the UE 830 or from the service provider operating the host computer 810, or both. While the OTT connection 850 is active, the network infrastructure may further take decisions by which it dynamically changes the routing (e.g., on the basis of load balancing consideration or reconfiguration of the network).

The wireless connection 870 between the UE 830 and the base station 820 is in accordance with the teachings of the embodiments described throughout this disclosure. One or more of the various embodiments improve the performance of OTT services provided to the UE 830 using the OTT connection 850, in which the wireless connection 870 forms the last segment. More precisely, the teachings of these embodiments may reduce the latency and improve the data rate and thereby provide benefits such as better responsiveness.

A measurement procedure may be provided for the purpose of monitoring data rate, latency and other factors on which the one or more embodiments improve. There may further be an optional network functionality for reconfiguring the OTT connection 850 between the host computer 810 and UE 830, in response to variations in the measurement results. The measurement procedure and/or the network functionality for reconfiguring the OTT connection 850 may be implemented in the software 811 of the host computer 810 or in the software 831 of the UE 830, or both. In embodiments, sensors (not shown) may be deployed in or in association with communication devices through which the OTT connection 850 passes; the sensors may participate in the measurement procedure by supplying values of the monitored quantities exemplified above, or supplying values of other physical quantities from which software 811, 831 may compute or estimate the monitored quantities. The reconfiguring of the OTT connection 850 may include message format, retransmission settings, preferred routing etc.; the reconfiguring need not affect the base station 820, and it may be unknown or imperceptible to the base station 820. Such procedures and functionalities may be known and practiced in the art. In certain embodiments, measurements may involve proprietary UE signaling facilitating the host computer's 810 measurements of throughput, propagation times, latency and the like. The measurements may be implemented in that the software 811, 831 causes messages to be transmitted, in particular empty or "dummy" messages, using the OTT connection 850 while it monitors propagation times, errors etc.

Figures 9, 10:
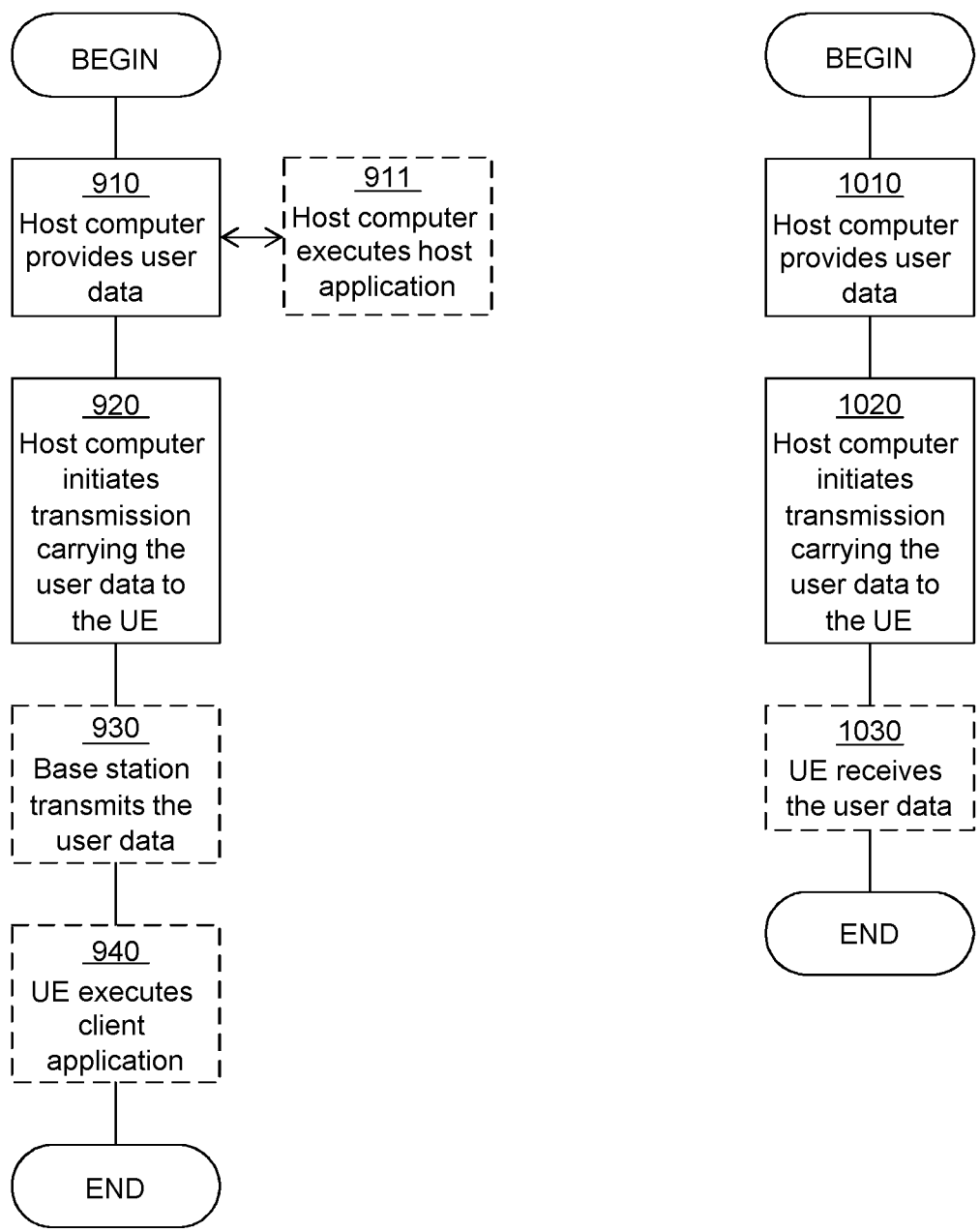
FIGS. 9 and 10 show flowcharts for method embodiments implemented in a communication system comprising embodiments of the host computer, the base station and the user equipment.

FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section. In a first step 910 of the method, the host computer provides user data. In an optional substep 911 of the first step 910, the host computer provides the user data by executing a host application. In a second step 920, the host computer initiates a transmission carrying the user data to the UE. In an optional third step 930, the base station transmits to the UE the user data which was carried in the transmission that the host computer initiated, in accordance with the teachings of the embodiments described throughout this disclosure. In an optional fourth step 940, the UE executes a client application associated with the host application executed by the host computer.

FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In a first step 1010 of the method, the host computer provides user data. In an optional substep (not shown) the host computer provides the user data by executing a host application. In a second step 1020, the host computer initiates a transmission carrying the user data to the UE. The transmission may pass via the base station 100, in accordance with the teachings of the embodiments described throughout this disclosure. In an optional third step 1030, the UE receives the user data carried in the transmission.

As has become apparent from above description, embodiments of the technique enable that personal data be not stored on the base station, e.g., in compliance with data privacy regulations.

Alternatively or in addition, by removing the identifier as personal data from logs, traces and/or events, the personal data is not exposed from the base station and/or cannot be misused.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method performed by a base station for relaying control messages between a core network entity of a communications network and radio devices served by the base station of the communications network, the method comprising or initiating:
   relaying each of the control messages from one of the radio devices to the core network entity or from the core network entity to one of the radio devices, wherein each of the relayed control messages comprises an identifier that is indicative of at least one of the respective one of the radio devices and a user thereof; and
   storing the control messages at the base station, wherein the identifier is replaced in each of the stored control messages by a placeholder value that is independent of at least one of the respective one of the radio devices and the user thereof.

2. The method of claim 1, further comprising or initiating at least one of:
   receiving a configuration message comprising a trigger for at least one of the storing of the control messages and the replacing of the identifier in each of the stored control messages,
   optionally wherein at least one of the storing of the control messages and the replacing of the identifier in each of the stored control messages is performed responsive to the receiving of the configuration message comprising the respective trigger; and sending the stored control messages to a Network Management System, NMS, of the communications network or to an Operations, Administration and Maintenance, OAM, entity of the communications network.

3. The method of claim 1, wherein each of the stored control messages comprises the same placeholder value, and/or
wherein the placeholder value is predefined or configured at the base station,
optionally wherein the placeholder value is configured according to a configuration message, and/or
wherein the placeholder value is a pseudo-random number computed by the base station for each of the control messages relayed by the base station or for each of the radio devices served by the base station or wherein the placeholder value is a pseudo-random number computed by the base station for a set of the stored control messages or for a set of the radio devices,
optionally wherein the pseudo-random number is computed responsive to receiving a configuration message comprising a trigger for at least one of the storing of the set of the control messages and the replacing of the identifier in each of the stored control messages.

4. The method of claim 1, wherein the control messages are stored at the base station for a predefined or configured retention time,
optionally wherein the retention time is configured according to a configuration message.

5. The method of claim 1, wherein the relaying comprises receiving at least one of the control messages on a radio interface, optionally an uplink radio channel, from the respective one of the radio devices and forwarding the at least one received control message on a backhaul interface, optionally a non-radio channel, to the core network entity, and/or
wherein the relaying comprises receiving at least one of the control messages on a backhaul interface, optionally a non-radio channel, from the core network entity and forwarding the at least one received control message on a radio interface, optionally a downlink radio channel, to the respective one of the radio devices.

6. The method of claim 5, wherein a protocol stack of the radio interface comprises at least one of a Radio Resource Control, RRC, layer; a packet Data Convergence Protocol, PDCP, layer; and a Radio Link Control, RLC, layer; and/or
wherein the communications system comprises a Fifth Generation System, 5GS, and the radio interface comprises an interface Uu for New Radio, NR; and/or
wherein the communications system comprises an Evolved Packet System, EPS, and the radio interface comprises an interface Uu for Long Term Evolution, LTE; and/or
wherein the communications system comprises a Fifth Generation System, 5GS, and a protocol stack of the backhaul interface comprises a Next Generation Application Protocol, NG-AP, layer; and/or
wherein the communications system comprises an Evolved Packet System, EPS, and a protocol stack of the backhaul interface comprises an S1 Application Protocol, S1-AP, layer; and/or
wherein the communications system comprises a Fifth Generation System, 5GS, and the backhaul interface comprises an N2 interface or an N2 reference point; and/or
wherein the communications system comprises an Evolved Packet System, EPS, and the backhaul interface comprises an S1 interface, optionally an S1-MME interface; and/or
wherein a Service Data Unit, SDU, in a PDU of the protocol stack of the radio interface and/or a SDU in a PDU of the protocol stack of the backhaul interface comprises at least one of a non-radio signaling, a NAS PDU, a N1 PDU, and a paging PDU.

7. The method of claim 1, wherein the control messages comprise at least one of:
non-access stratum, NAS, messages, optionally NAS protocol data units, NAS PDUs;
N1 messages, optionally N1 PDUs; and
paging messages, optionally paging PDUs.

8. The method of claim 1, wherein the control messages are relayed at the base station transparently and/or agnostically with regard to control signals included in the control messages.

9. The method of claim 1, wherein the core network entity is or comprises at least one of
a mobility management entity, MME; and
an Access and Mobility Management Function, AMF.

10. The method of claim 1, wherein the control messages are at least one of a peer-to-peer communication between the core network entity and the respective one of the radio devices and end-to-end encrypted between the core network entity and the respective one of the radio devices.

11. The method of claim 1, wherein the identifier comprises at least one of
a mobile identity, optionally a 5GS mobile identity or an EPS mobile identity;
a subscription permanent identifier, SUPI;
an international mobile subscriber identity, IMSI,
an international mobile equipment identity, IMEI, or international mobile station equipment identity;
a subscription concealed identifier, SUCI; and
a global unique temporary Identifier, GUT; and/or
wherein the identifier in the relayed control messages is uniquely indicative of the respective one of the radio devices among a plurality of radio devices served by the communications network.

12. The method of claim 1, wherein each of the stored control messages is structurally identical with and/or unabridged compared to the respective one of the relayed control messages.

13. The method of claim 1, wherein the identifier is replaced before storing the control message; and/or
wherein the identifier is replaced in the stored control messages.

14. The method of claim 1, wherein each or at least one of the control messages comprises multiple identifiers that each is indicative or that are in combination indicative of at least one of the respective one of the radio devices and a user thereof, and wherein each of the multiple identifiers is replaced in the stored control messages by the placeholder value that is independent of at least one of the respective one of the radio devices and the user thereof.

15. A base station for relaying control messages between a core network entity of a communications network and radio devices served by the base station of the communications network, the base station comprising memory operable to store instructions and processing circuitry operable to execute the instructions, such that the base station is operable to:
relay each of the control messages from one of the radio devices to the core network entity or from the core network entity to one of the radio devices, wherein each of the relayed control messages comprises an identifier that is indicative of at least one of the respective one of the radio devices and a user thereof; and store the control messages at the base station, wherein the identifier is replaced in each of the stored control messages by a placeholder value that is independent of at least one of the respective one of the radio devices and the user thereof.

16. A non-transitory computer-readable medium storing instructions executable by processing circuitry of a base station for relaying control messages between a core network entity of a communications network and radio devices served by the base station of the communications network, whereby the base station is caused to:

relay each of the control messages from one of the radio devices to the core network entity or from the core network entity to one of the radio devices, wherein each of the relayed control messages comprises an identifier that is indicative of at least one of the respective one of the radio devices and a user thereof; and store the control messages at the base station, wherein the identifier is replaced in each of the stored control messages by a placeholder value that is independent of at least one of the respective one of the radio devices and the user thereof.

* * * * *